US008243988B1

(12) United States Patent
Buddemeier

(10) Patent No.: US 8,243,988 B1
(45) Date of Patent: Aug. 14, 2012

(54) CLUSTERING IMAGES USING AN IMAGE REGION GRAPH

(75) Inventor: Ulrich Buddemeier, Sebastopol, CA (US)

(73) Assignee: Google Inc., Mountain View, CA (US)

( * ) Notice: Subject to any disclaimer, the term of this patent is extended or adjusted under 35 U.S.C. 154(b) by 1049 days.

(21) Appl. No.: 12/183,613

(22) Filed: Jul. 31, 2008

(51) Int. Cl.
 *G06K 9/00* (2006.01)
(52) U.S. Cl. ...................................... 382/103
(58) Field of Classification Search .................. 382/103, 382/219, 154
 See application file for complete search history.

(56) References Cited

U.S. PATENT DOCUMENTS

| 6,580,811 | B2 | 6/2003 | Maurer et al. | |
| 6,711,293 | B1 | 3/2004 | Lowe | |
| 2003/0219147 | A1* | 11/2003 | Nishiura | 382/103 |
| 2006/0045325 | A1* | 3/2006 | Zavadsky et al. | 382/145 |

OTHER PUBLICATIONS

Maurer, T. et al. ,"Tracking and Learning Graphs on Image Sequences of Faces", Proceedings of International Conference on Artificial Neural Networks at Bochum; Jul. 16, 2006; 6 pages.
Lowe, David G., "Distinctive Image Features from Scale-Invariant Keypoints", International Journal of Computer Vision; Jan. 5, 2004; 28 pages.
Lowe, David G., "Object Recognition from Local Scale-Invariant Features", Proc. of the International Conference on Computer Vision; Sep. 1999; 8 pages.
Gronau, I., et al., "Optimal Implementations of UPGMA and Other Common Clustering Algorithms", Information Processing Letters; Dec. 2007; 6 pages.
Lindeberg, T., "On Scale Selection for Differential Operators", Proc. 8th Scandinavian Conference on Image Analysis; May 1993; pp. 857-866.
Buddemeier, U., et al., U.S. Appl. No. 12/049,841, filed Mar. 17, 2008, entitled "System and Methods for Descriptor Vector Computation".
Brucher, F.A.., et al., U.S. Appl. No. 12/119,359, filed May 12, 2008, entitled "Automatic Discovery of Popular Landmarks".

* cited by examiner

*Primary Examiner* — Claire X Wang
(74) *Attorney, Agent, or Firm* — Sterne Kessler Goldstein & Fox, P.L.L.C.

(57) ABSTRACT

Methods for grouping images from image corpora using graph clustering are presented. In one embodiment, a method is presented where grouping of images from a collection of digital images is done by: representing regions of images as vertices in a graph; connecting each pair of matching-vertices with a matching-edge; connecting each pair of overlap-vertices with an overlap-edge; assigning weights to each said matching-edge and to each said overlap-edge; clustering the graph, wherein clustering generates one or more vertex-clusters; and grouping the digital images into visual-clusters based on the vertex-clusters. Corresponding systems and computer program products are also presented.

23 Claims, 6 Drawing Sheets

CLUSTERING IMAGES USING AN IMAGE REGION GRAPH

BACKGROUND

This invention relates generally to the grouping of digital images and more specifically to using image region graphs in clustering of images.

BACKGROUND ART

With the increased use of digital images, increased capacity and availability of digital storage media, and the interconnectivity offered by digital transmission media such as the Internet, ever larger corpora of digital images are accessible to an increasing number of people. To leverage the information contained in these large corpora of digital images, it is necessary that the corpora be organized. For example, at digital image web sites such as Google Photos or Picasa, starting at a high level menu, one may drill down to a detailed listing of subjects for which photographs are available. Alternatively, one may be able to search one or more sites that have digital photographs. One user may want the corpora to be organized according to geographic destinations, while another may want them organized according to people in the images. Similarly, there could be additional criteria based on which each person wants the collection organized.

In most existing systems, images are organized or grouped together, based on user provided tags that describe the contents of each image. However, when considering large corpora from diverse sources, user-provided tag-based organization schemes fail to scale. For example, users may fail to consistently and/or accurately tag all available images, and there may be differences in tags provided by different users for the same image. In addition, due to the vast number of images available, users are unlikely to tag all of the available images. Therefore, in general, efficiently organizing large corpora of images is difficult.

However, efficient methods exist for matching individual images with one another. If the ability to match individual images can be leveraged to automatically group the images of the corpora into groups based on image similarity, it would aid the process of image organization and search. For example, once images are automatically grouped, the contents of those images may be described to some extent by information known about one or more images in that group. In addition, the user may provide tags and/or description to a group of images instead of individual images, thus significantly reducing the burden on the user while at the same time, potentially enhancing the accuracy of any user provided descriptions.

Therefore, what is needed is an efficient method to automatically group images.

SUMMARY

Methods for grouping images from image corpora using graph clustering are presented. In one embodiment, a method is presented where grouping of images from a collection of digital images is done by: representing regions of images as vertices in a graph; connecting each pair of matching-vertices with a matching-edge; connecting each pair of overlap-vertices with an overlap-edge; assigning weights to each said matching-edge and to each said overlap-edge; clustering the graph, wherein clustering generates one or more vertex-clusters; and grouping the digital images into visual-clusters based on the vertex-clusters.

In another embodiment a system for grouping images is presented, having: a processor; an interface, wherein the interface connects to a collection of digital images; and a visual clustering module that groups images from the collection of digital images. The visual clustering module includes: a graph generator module that generates a graph, where vertices represent regions in an image, where matching-edges connect regions to corresponding regions in different images, and where overlap-edges connect regions in the same image; an image clusterer module, that generates one or more vertex-clusters from the graph; and an image grouper module for grouping images into visual-clusters, wherein the grouping is based on said vertex-clusters.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Overview

The vast size and dynamicity of the image corpora that can be leveraged to obtain useful information calls for highly scalable, adaptable, efficient methods to organize and search these images. Although user-provided information, such as tags, that describe each image can be useful in organizing and/or searching these images, methods based solely on user-provided information may not provide the requisite scale or efficiency that is desired. In this disclosure, methods and associated systems of automatically grouping images based, for example, on interest-point matching, are disclosed.

The methods disclosed may be used to rank images in similarity to each other, or to a specified image. The methods may also be used to facilitate the process of adding or maintaining user provided image descriptions and to organize images based on image contents.

System Components

Figure 1:
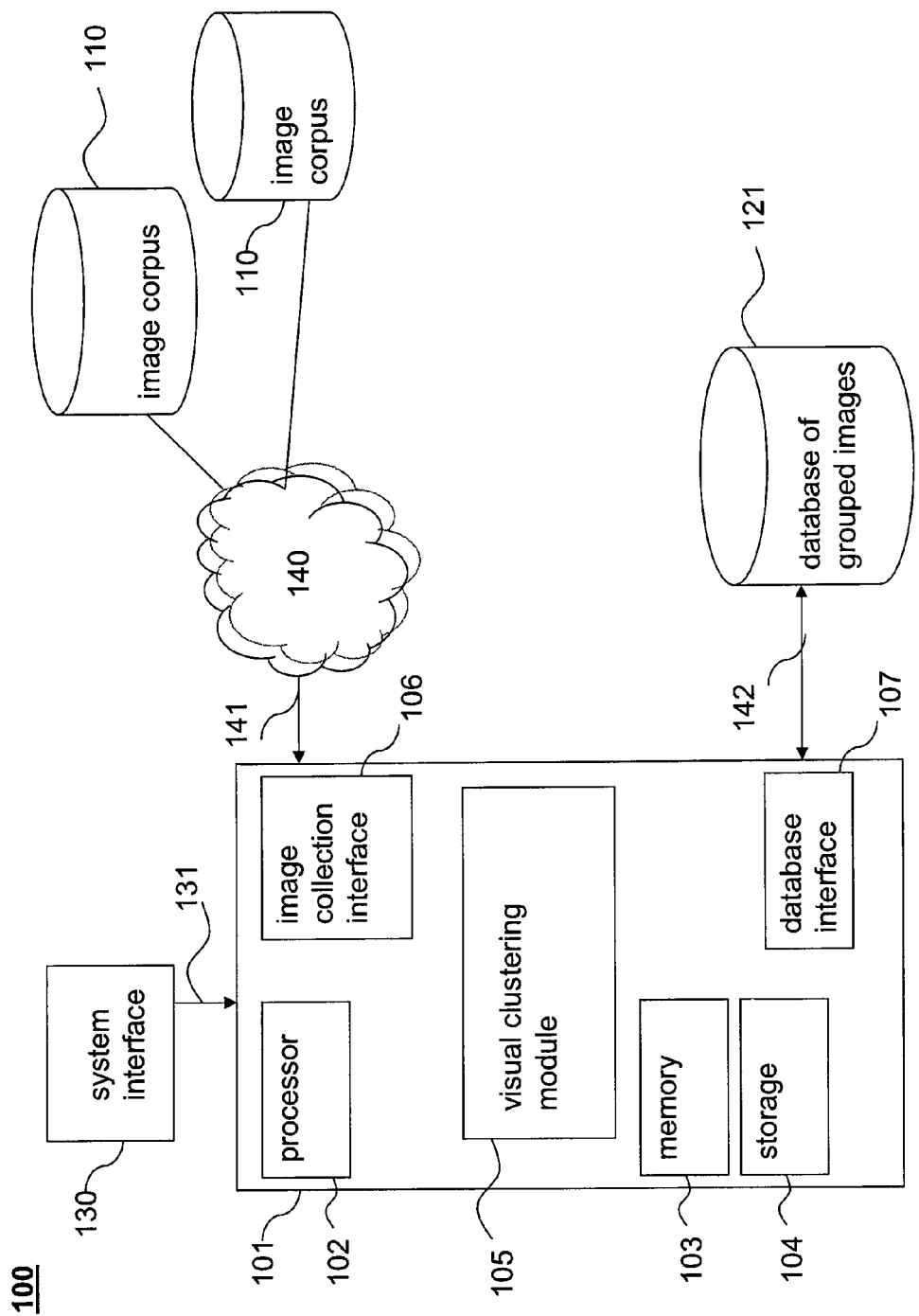
FIG. 1 is a system for automatically clustering images from image corpora, according to an embodiment of the present invention.

FIG. 1 illustrates a system according to an embodiment of the present invention that can automatically classify images from image corpora. A computer 101 that implements the classification methods according to teachings in this disclosure is connected to image corpora 110, a database of grouped images 121, and a system interface 130. The image corpora 110 may be local to computer 101, or may be coupled through a link 141. Link 141 may be a device-internal connection such as peripheral component interchange (PCI) bus, a local area network, or a connection to a wide area network 140.

Database of grouped images 121, is coupled to computer 101 using a link 142. Link 142 may be a device-internal connection such as a PCI bus, a local area network, or a connection to a wide area network. Database 121 may include the results of the image classification processing from computer 101. Database 121 may also include storage of images, resulting classification and search information, and any other data relevant to the classification of images according to the teachings in this disclosure. Database 121 may include functions to organize and manage images, for example and without limitation, a database management system. However, the term "database" is used in this disclosure broadly to mean a data storage entity with or without an associated data organization and retrieval system such as a database management system.

System interface 130 is coupled to computer 101 through a link 131. Interface 130 may connect computer 101 to another information processing system, or to a user. Link 131 may be a device-internal connection such as a PCI bus, a local area network, or a connection to a wide area network. System interface 130 may include a user input interface and display. System interface 130 may also include a web-based graphical user interface. User provided configuration information and feedback, as well as display of the image classification progress and/or results may be achieved using system interface 130.

Computer 101 includes a processor 102, memory 103, storage 104, a visual clustering module 105, an image collection interface 106, and a database interface 107. Processor 102, memory 103, storage 104, and other components, including network or device interfaces (not shown), may be coupled with an internal bus (not shown). In some embodiments, processor 102 includes the capability to execute the instructions of modules 105, 106, and 107 in implementing the teachings of this disclosure. The operating environment of computer 101 may include one or more operating systems, including, for example, any variant of Microsoft Windows or Linux operating systems. Memory 103 may include a random access temporary memory that provides temporary storage for data and instructions during the execution of the instructions in modules 105, 106, and 107. Storage 104 may include a hard disk and/or removable storage that provide temporary or permanent storage for data and/or instructions forming the control logic in modules 105, 106, and 107.

Visual clustering module 105 includes instructions that enable the classification and grouping of images according to the teachings of this disclosure. Image collection interface 106 includes the instructions for maintaining the links to image corpora being used for processing in computer 101, and may also include instructions for downloading and maintaining images from external sources for use in computer 101. For example, some or all of the images from image corpora 110 may be stored locally on storage 104 using image collection interface 106, prior to processing by visual clustering module 105. Database interface 107 includes instructions to enable the interaction between computer 101 and database 121. For example, the output of the visual clustering module 105, including visual clusters, may be written out to database 121 using database interface 107. Visual clusters include the groups of images that are created based on the clustering done according to the teachings in this disclosure. Also, database interface 107 may enable the modules of computer 101, including visual clustering module 105, to use information stored in database 121 in their processing. The instructions of modules 105, 106 and 107, in their original form, may be written in any computer programming language including C, C++, Java or Assembly, or a combination thereof. Also, modules 105, 106 and 107, may include software, firmware, hardware or any combination thereof.

Figure 2:
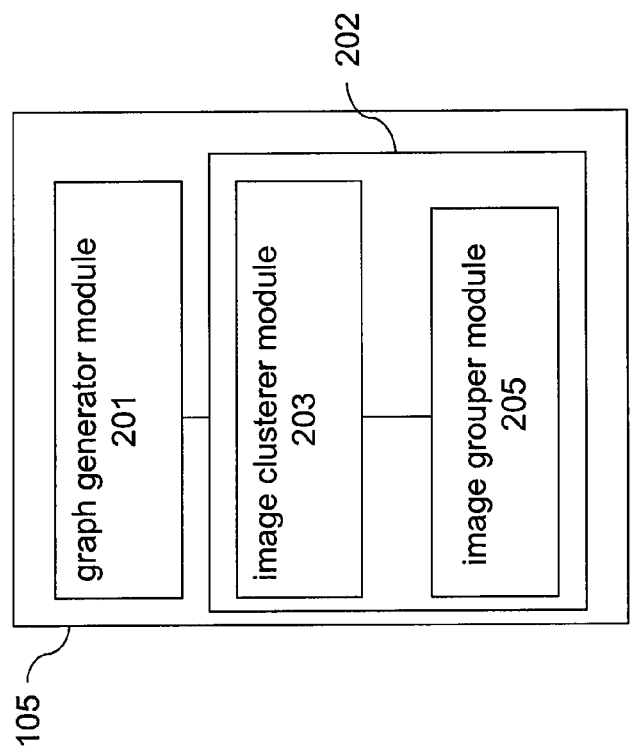
FIG. 2 shows further details of the visual clustering module shown in FIG. 1, according to an embodiment of the present invention.

FIG. 2 shows more detail of the composition of visual clustering module 105 in one embodiment of the present invention. Visual clustering module 105 includes a graph generator module 201 that generates a graph, for example, a region graph, based on the images from the image corpora; and an image organizer module 202 that generates visual-clusters of images based on the graph. Graph generator module 201 may, for example and without limitation, include logic instructions to: represent regions (see below for definition) in images as vertices in a graph; connect each pair of vertices that represent corresponding regions in two images; connect each pair of vertices that represent regions of the same image; and assign weights to each edge in the graph. Graph organizer module 202, in some embodiments, may further include an image clusterer module 203 that clusters the images based on the graph constructed in stage 201, and an image grouper module 205 that groups the clustered images into visual-clusters according to the clustering and user preferences. The operations performed by modules, including modules 201, 203 and 205, are described in greater detail below with respect to FIGS. 3-5.

Creating a Region Graph

Figure 3:
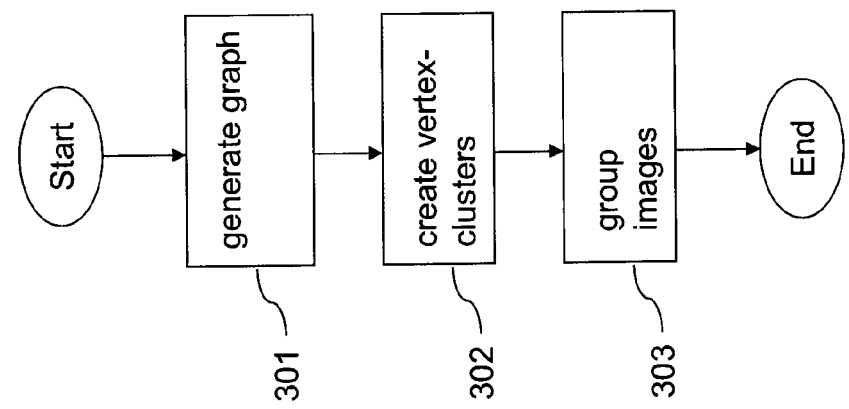
FIG. 3 is a flowchart illustrating the processing stages for grouping images based on graph clustering, according to an embodiment of the present invention.
Figure 4:
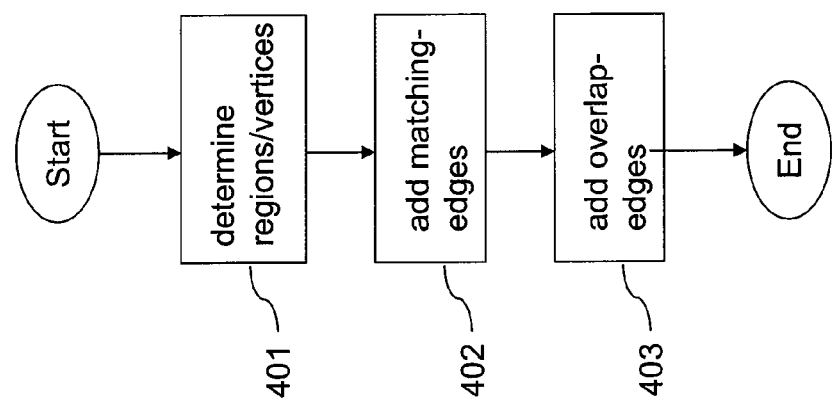
FIG. 4 shows further details of the graph generation stage of FIG. 3, according to an embodiment of the present invention.
Figure 5:
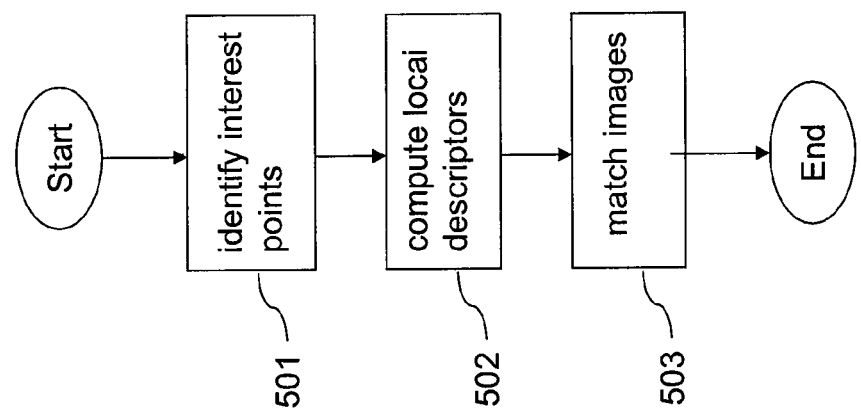
FIG. 5 shows further details of the determine regions/vertices step of FIG. 4, according to an embodiment of the present invention.

FIG. 3 is a flowchart showing the processing stages of a method of grouping images according to an embodiment of the present invention. The first stage, stage 301, generates a graph, referred to herein as a region graph, based on the images to be processed. FIG. 4 is a more detailed breakdown of the components of stage 301. The first activity in generating the graph is to determine the vertices of the region graph, as indicated in stage 401. Stage 401, in one embodiment of the present invention, is further broken down to its constituent processing stages as shown in FIG. 5.

In stage 501, each image is processed to identify interest-points. An interest-point is a point in an image that has a well defined position and that can be detected readily, even in the presence of some image noise and differing scales. Interest-points can be corner points, points of lines, points of locally high curvature or other locally significant points. A number of interest-point detectors are known and may be used in stage 501. In one embodiment, the interest-point detector identifies interest-points by looking for locations on an image that are maxima or minima of a Laplacian-of-Gaussian function. A method of detecting interest-points using a Laplacian-of-Gaussian function is described in Lindeberg, Tony, "*On Scale Selection for Differential Operators*", Proc. 8$^{th}$ Scandinavian Conference on Image Analysis, Tromso, Norway, May 1993, pp. 857-866, which is hereby incorporated by reference in its entirety.

In stage 502, local descriptors are computed for each interest-point detected in stage 501. A local descriptor corresponding to a particular interest-point describes a set of features in the area defined by the interest-point. The set of features included in a local descriptor may be predefined based on application requirements. In the embodiment described above that detects interest-points using a Laplacian-of-Gaussian function in stage 501, local descriptors are generated by sampling the local region of the image relative to its scale-space coordinate frame using a set of Gabor wavelets. By generating local descriptors in this manner, the feature representation can be made invariant to many local variations. Local descriptors are also interchangeably referred to as feature vectors.

In stage 503, image matching is performed using the local descriptors computed in stage 502. The matching of two images may include comparison of features of the set of local descriptors of each image. The matching need not be absolute and may be based on a scoring that indicates the extent of matching features of each interest-point such that the scores can be aggregated over the set of interest-points for a pair of images that are compared. The scoring may also include predefined numerical weights assigned to each feature such that selected features may exert a higher impact on the matching process.

In one embodiment of the present invention, an image index may be generated describing each image that was processed in stages 501 and 502. The index may include a list of the images where, for each image, several data elements are included. For example, the data elements may include the original image or a reference to the original image, an image derived from the original image (e.g., a low resolution thumbnail image), one or more image templates and local descriptors. The data elements may also include other information such as user information, geo-tagging information where available and user-provided or automatically assigned tag information. Once the index is created, each image can be matched against the index. As described above, the matching itself may be based on matching the corresponding sets of the local descriptors. When the matching process is completed for all images, the index should include, for each image, references to all matching images.

A region is a set of interest-points that contribute to a match between a pair of images. Therefore, a region is defined between a pair of images, and it is possible that a particular interest-point is included in more than one region. For example, if images A and B, and images A and C are matching pairs, then it is possible that a particular interest-point on image A contributes to the match between A and B as well as to the match between A and C, thereby becoming a part of the regions defined for both pairs.

Returning to FIG. 4, determining the regions based on interest-points yields the set of vertices for the graph, in stage 401, as described with respect to FIG. 5 above. For example, each region corresponds to a vertex in the graph being constructed, i.e., the region graph.

In stage 402, vertices are connected with matching-edges. Having already determined regions in stage 401, the set of image pairs between which matching-edges should be drawn is already determined. A matching-edge is added between image A and image B (more specifically, between a region in image A and a region in image B), if they match, i.e., they exceed a threshold level of matching based on the set of feature vectors. For example, in the image index described above, if the entry for image A lists image B as a match with a score exceeding a predefined threshold, a matching-edge is added between the vertices that are considered a match. Each matching-edge is assigned a weight or cost as in formula (1):

$$d_{ij} = \frac{1}{-\log(p_{FPij})} \tag{1}$$

where $P_{FPij}$ is the probability that the match between region i and region j is a false positive. Other embodiments of the present invention may assign costs based on a different measure of the strength of the match depicted by the edge, or match confidence.

In stage 403, edges of a second type are added to the region graph. In this stage, for each image, overlap-edges are created to inter-connect all regions within the image. The cost assigned to an overlap-edge is indicative of the level of overlap between the two regions connected by the overlap-edge. In one embodiment, the cost may be assigned as indicated in formula (2):

$$d_{ij} = f_d \frac{|r_i - r_j|_{L2}}{\sqrt{s_i + s_j}} \tag{2}$$

with $$r_i = \frac{1}{K} \sum_{k=1}^{K} r_{ik}$$

the center-of-gravity of region i, $$s_i = \frac{1}{K} \sum_{k=1}^{K} (|r_{ik}|_{L2}^2 + 2\sigma_s^2 s_{ik}^2) - |r_i|_{L2}^2$$

the squared expansion of region i, and $(r_{ik}, s_{ik})$ the interest-points comprising region i. $f_d$ is a factor to adjust the two different distance measures. $\sigma_s$ is a scale multiple to account for the size of the image patch used to compute the descriptor relative to the interest-point scale $s_{ik}$. K is the number of interest points in a region, and L2 denotes the L2-norm. Formula (2) effectively treats the interest-points as Gaussian blobs instead of points for the purpose of expansion computation.

Figure 6:
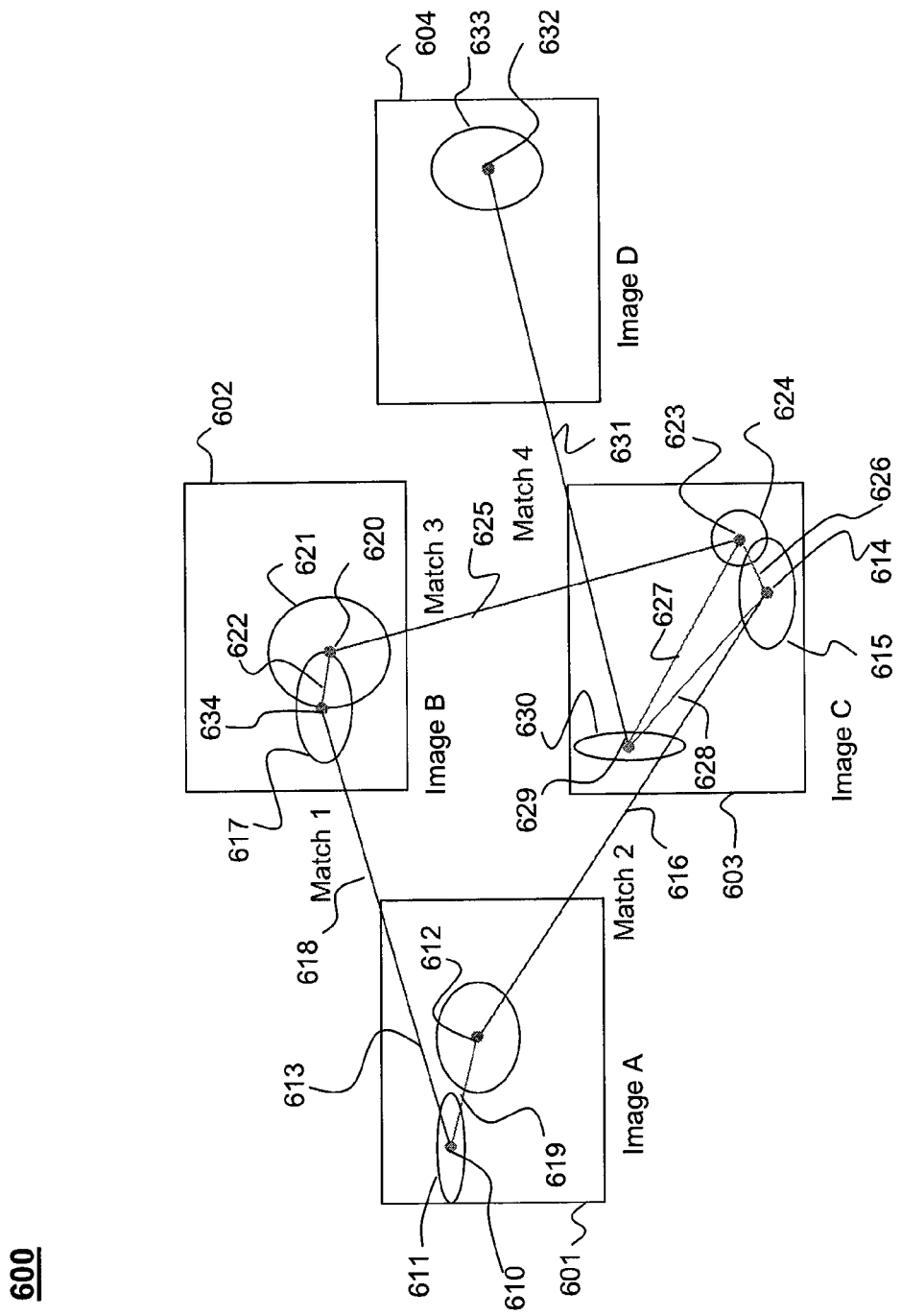
FIG. 6 shows an example of a graph constructed according to an embodiment of the present invention.

FIG. 6 illustrates an example graph 600 according to one embodiment of the present invention, using four images, Image 601, Image 602, Image 603, and Image 604. Graph 600 in FIG. 6 may be used to clarify the terminology used in this disclosure. As an example, the point 612 in Image 601 is the center of gravity of the set of interest-points that match with Image 603. The center-of-gravity may be determined by a number of methods, including, by computing the average x and y coordinates of corresponding interest-points. The matching interest-points on Image 601 lie within the region 613. The corresponding region in Image 603, is region 615. Region 615 encompasses the set of interest-points on Image 603 that matched Image 601, and has the center-of-gravity 614. Edge 616 that connects region 613 in Image 601 and region 615 in Image 603 is a matching-edge. The cost, i.e., distance, of edge 616 is determined based on the points 612 and 614.

Region 611 is also in Image 601, and the center-of-gravity of the interest-points in region 611 is point 610. A region 617 encompasses interest-points in Image 602 that match with the interest-points of region 611. Region 617 is centered on the center-of-gravity 634 of the corresponding interest-points. Edge 618 is a matching-edge. Also, because region 611 and region 613 are in the same Image 601, the edge 619 that connects regions 611 and 613 is an overlap-edge.

FIG. 6 also illustrates that regions, as defined in this disclosure, can overlap. For example, regions 617 and 621 (the interest-points of region 621 has the center-of-gravity at point 620) have common interest-points in the area in which they intersect.

Regions 624 and 630 in Image 603 have their centers-of-gravity at points 623 and 629, respectively. Region 633 in Image 604, the only area in Image 604 that matches another image, has its center-of-gravity in point 632. Overall, the region graph corresponding to FIG. 6 has: vertices corresponding to regions 611, 613, 617, 621, 615, 624, 630 and 633; matching-edges 616, 618, 625, and 631; and overlap-edges 619, 622, 626, 627 and 628.

Once all edges are assigned, in some embodiments, a shortest path graph may be generated from the region graph. In a shortest path graph, the distance between any two regions n and m may be defined as in formula (3):

$$d_{nm} = \min_{P} \sum_{(i,j) \in P} d_{ij} \quad (3)$$

where P is the shortest path connecting n and m in the region graph. Depending on the density of the graph, i.e., the ratio of edges to vertices two different algorithms can be used to find shortest paths: for dense graphs where the number of edges far exceeds the number of vertices, the Floyd-Warshall algorithm can be used; and, for sparse graphs, the Dijkstra shortest path algorithm can be used. Both these algorithms are known in the art.

Clustering the Region Graph

Returning to FIG. 3, at the end of processing in stage 301, now that a distance is established between any two match regions in the image set, traditional clustering algorithms can be applied to find sets of regions that likely contain the same object. Since it is not known a priori how many clusters would result, k-means and similar methods of clustering are not suitable for the teachings in this disclosure. Clustering is implemented in stage 302.

In an embodiment of the present invention, hierarchical agglomerative clustering is used. In hierarchical agglomerative clustering, at each clustering step, pairs of vertices having the lowest cost (e.g., shortest path in a shortest path graph) are merged to form clusters of aggregated regions, iteratively until no more regions or aggregated regions exist with a cost below a predefined threshold. The resulting graph is a collection of clusters connected by edges.

The distance between the clusters may be defined in multiple ways. For example, formulas (4a), (4b), and (4c) show three possible approaches to computing the distance between two clusters n and m:

$$d(C_n, C_m) = \min_{i \in C_n, j \in C_m} d_{ij} \quad (4a)$$

$$d(C_n, C_m) = \frac{1}{|C_n||C_m|} \sum_{i \in C_n, j \in C_m} d_{ij} \quad (4b)$$

$$d(C_n, C_m) = \max_{i \in C_n, j \in C_m} d_{ij} \quad (4c)$$

Formula (4a) does not consider intra-cluster distances, and thus does not penalize very extensive clusters. Formula (4c), on the other hand, is directly dependent on cluster extension. Formula (4b) is in between (4a) and (4c) with regard to penalizing widely spread out clusters. All three distance measures (4a), (4b) and (4c), are commutative (since they only depend on the cluster constituents) and convex. This enables the application of nearest neighbor chains to solve the agglomerative clustering problem in $O(N^2)$ time. In some embodiments of the present invention, an agglomerative clustering algorithm with nearest neighbor chains can be used with one of the measures (4a), (4b) or (4c) for inter-cluster distance, i.e., lowest cost. One example of this algorithm is described in Gronau, I., and Moran, S., "*Optimal Implementation of UPGMA and Other Common Clustering Algorithms*," Information Processing Letters, Volume 104, Issue 6, 16 Dec. 2007, Pages 205-210, which is incorporated herein by reference in its entirety.

In another embodiment, using formula (4a) for inter-cluster distance enables the clustering result to be obtained using an equivalent algorithm. For example, instead of establishing a distance between any two vertices using a shortest path algorithm as in hierarchical agglomerative clustering, the same result can be obtained by deleting all edges with cost above the threshold. The groups of vertices still connected by edges (directly or indirectly) then comprise the clusters.

After the clusters are created in stage 303, in step 303 the images are grouped using the clustering. In one embodiment, given a cluster, the set of images containing all regions (vertices) of that cluster is the group of images corresponding to that vertex cluster. Also, based on the clustering and grouping, other aspects may be achieved. For example, within a given cluster, the image having the highest number of connecting edges may be selected as a representative image for that cluster or corresponding image group.

Having completed the clustering and grouping, the results of the processing may be stored and maintained in such a way that additions of new images to the image corpora can be incrementally integrated to the grouping.

The systems and methods of FIGS. 3-5 and the accompanying description can be implemented in software, firmware, hardware, or using any combination thereof. If programmable logic is used, such logic can execute on a commercially available processing platform or a special purpose processing platform. The programmable logic may be specified using any programming language. In an embodiment where the teachings of this disclosure are implemented using software, the software may be stored in a computer program product and loaded into a processing platform (for example, computer 101) for execution. The control logic (also referred to as computer program logic or computer program) when executed by the processor (for example, processor 102), causes the processor (for example, processor 102) to perform the functions of FIGS. 3-5 and the accompanying description.

Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for grouping images from a collection of digital images, comprising:
    (a) representing, using a processor, regions of images as vertices in a graph, wherein the images are from the collection of digital images;
    (b) connecting, using the processor, each pair of matching-vertices with a matching-edge in the graph, wherein two vertices are matching-vertices if they represent corresponding regions in two images;
    (c) connecting, using the processor, each pair of overlap-vertices with an overlap-edge in the graph, wherein two vertices are overlap-vertices if they represent regions of the same image;
    (d) assigning, using the processor, weights to each said matching-edge and to each said overlap-edge;
    (e) organizing, using the processor, the graph into visual-clusters; and
    (f) outputting, using the processor, one or more signals corresponding to the visual-clusters.

2. The computer-implemented method of claim 1, wherein each visual-cluster comprises images containing regions corresponding to all vertices in a vertex-cluster.

3. The computer-implemented method of claim 1, wherein each region includes an area on an image that is defined by interest-points and that has a corresponding area in another image.

4. The computer-implemented method of claim 1, wherein each weight assigned to a matching-edge is based on a level of confidence in a corresponding match.

5. The computer-implemented method of claim 4, wherein the level of confidence is based on the probability that a match between corresponding regions is a false positive.

6. The computer-implemented method of claim 1, wherein each weight assigned to an overlap-edge is based on a level of corresponding region overlap.

7. The computer-implemented method of claim 6, wherein the level of corresponding region overlap is based on a distance between centers-of-gravity of corresponding regions.

8. The computer-implemented method of claim 7, wherein the level of corresponding region overlap is further based on the size of each corresponding region.

9. The computer-implemented method of claim 8, wherein the size of each region is based on the average distance of points in the region to the center of gravity of the region.

10. The computer-implemented method of claim 1, wherein organizing the graph into visual-clusters comprises:
    (i) clustering the graph, wherein clustering generates one or more vertex-clusters, and wherein each vertex-cluster includes a subgraph of the graph; and
    (ii) grouping said digital images into the visual-clusters, wherein the grouping is based on said vertex-clusters.

11. The computer-implemented method of claim 10, wherein clustering the graph comprises:
    (A) generating a minimum spanning tree of the graph; and
    (B) forming the vertex-clusters based on the minimum spanning tree.

12. The computer-implemented method of claim 10, wherein clustering the graph includes using a hierarchical-clustering algorithm to generate the vertex clusters.

13. The computer-implemented method of claim 12, wherein the hierarchical-clustering algorithm includes hierarchical-agglomerative clustering.

14. The computer-implemented method of claim 12, wherein the clustering is performed on a pruned version of the graph.

15. The computer-implemented method of claim 1, further comprising:
    (g) removing redundant images before organizing: the graph into visual-clusters, wherein an image in the graph is redundant if it is similar to another image in the graph.

16. The computer-implemented method of claim 1, further comprising:
    (h) selecting representative images for a visual-cluster, wherein the representative images include one or more images in the visual-cluster having the most matching-edges relative to other images in same visual cluster.

17. A system for grouping images, comprising:
a processor;
an interface, wherein the interface connects to a collection of digital images; and
a visual clustering module that groups images from the collection of digital images, the visual clustering module comprising:
    a graph generator module configured to generate a graph, wherein vertices of the graph represent regions in an image, wherein matching-edges connect regions to corresponding regions in different images, wherein overlap-edges connect regions in the same image, wherein matching-edges are assigned weights based on the probability that the match between the corresponding regions is a false positive, and wherein overlap-edges are assigned weights based on the center-of-gravity and size of corresponding regions; and
    a graph organizer module, configured to organize the graph into visual-clusters; wherein the visual clustering module embodied as computer program code is executed by the processor, and the visual clustering module is configured to access the collection of digital images through said interface.

18. The system of claim 17, further comprising:
a database module configured to manage the visual-clusters.

19. The system of claim 17, wherein the graph organizer module further comprises:
- an image clusterer module, configured to generate one or more vertex-clusters from the graph, and wherein each vertex-cluster includes a subgraph of the graph; and
- an image grouper module configured to group images into the visual-clusters, wherein the grouping is based on said vertex-clusters.

20. A computer program product comprising a computer usable medium having computer program logic recorded thereon for causing a processor to group images from a collection of digital images, said computer program logic comprising:
- a first computer program that causes the processor to represent regions of images as vertices in a graph, wherein the images are from the collection of digital images;
- a second computer program that causes the processor to connect each pair of matching-vertices with a matching-edge in the graph, wherein two vertices are matching-vertices if they represent corresponding regions in two images;
- a third computer program that causes the processor to connect each pair of overlap-vertices with an overlap-edge in the graph, wherein two vertices are overlap-vertices if they represent regions of the same image;
- a fourth computer program that causes the processor to assign weights to each said matching-edge and to each said overlap-edge;
- a fifth computer program that causes the processor to organize the graph into visual-clusters; and
- a sixth computer program that causes the processor to output one or more signals corresponding to the visual-clusters.

21. The computer program product of claim 20, wherein the fifth computer program further causes the processor to:
- cluster the graph generating one or more vertex-clusters, and wherein each vertex-cluster includes a subgraph of the graph; and
- group said digital images into the visual-clusters, wherein the grouping is based on said vertex-clusters.

22. The computer program product of claim 20, the computer program logic further comprising:
- a seventh computer program product that causes the processor to select representative images for a visual-cluster, wherein the representative images include one or more images in the visual-cluster having the most matching-edges relative to other images in same visual cluster.

23. The computer-implemented method of claim 1, wherein the visual clusters include both matching-edges and overlap-edges.

\* \* \* \* \*